July 4, 1950    A. G. HERRESHOFF ET AL    2,513,637
MECHANICAL CONNECTION
Filed Oct. 11, 1946

INVENTORS
Alexander G. Herreshoff
John P. Butterfield
BY
Harness and Harris
ATTORNEYS.

UNITED STATES PATENT OFFICE 2,513,637

MECHANICAL CONNECTION

Alexander G. Herreshoff, Grosse Pointe, and John P. Butterfield, Highland Park, Mich., assignors to Chrysler Corporation, Highland Park, Mich., a corporation of Delaware Application October 11, 1946, Serial No. 702,848

3 Claims. (Cl. 287—21)

This invention relates to means for effecting a force transmitting connection between angularly disposed members.

A typical application of the invention is found in the control rods of a motor vehicle such as are found in the linkages actuating shift control mechanisms, clutches and carburetor throttles. The invention could be applied to control apparatus in other mechanisms but the motor vehicle is selected as an application for which the device is especially adapted.

It is an object of the invention to provide a clip and a novel rod formation which will cooperate to secure a pair of rods in angular relationship and permit the transmission of force between the rods independently of the clip.

It is a further object of the invention to provide a connection between two operating members so that they may be connected or disconnected with a minimum of effort.

An additional object of the invention is to provide a means for connecting operating members that will retain the members in operative relationship regardless of wear of the members and which is particularly economical to manufacture and assemble.

Figure 1:
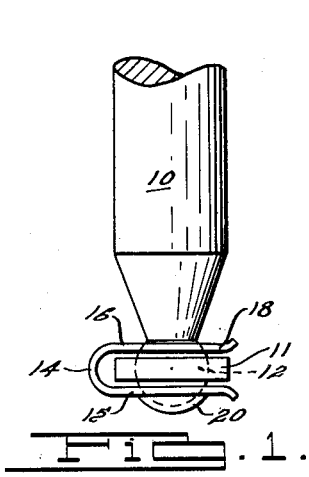
Fig. 1 is a view in elevation showing the operative connection of the members.
Figure 2:
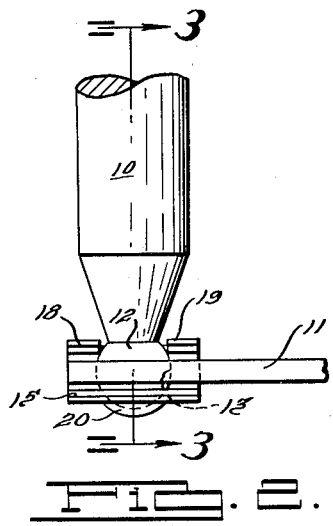
Fig. 2 is a side view in elevation of Fig. 1.
Figure 3:
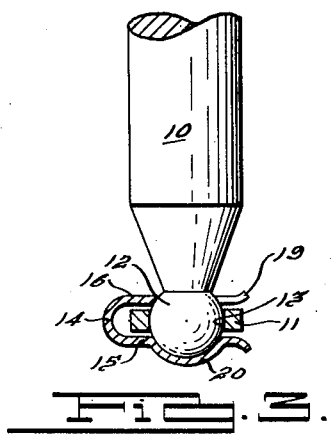
Fig. 3 is a section on the line 3—3 of Fig. 2.
Figure 4:
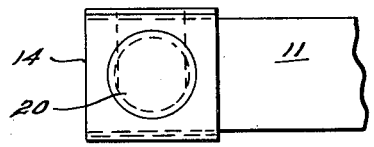
Fig. 4 is a bottom view of Fig. 1.
Figure 5:
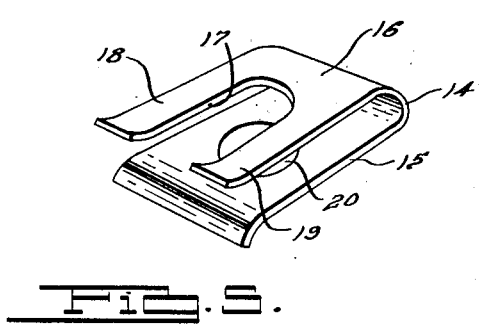
Fig. 5 is a perspective view of the clip.

In Fig. 1 members 10 and 11 are illustrated as control rods disposed in normal relationship and adapted to transmit force. The members 10 and 11 have been illustrated as disposed at right angles to each other although other angular relationships would be possible and within the scope of the invention. Member 10 has a ball 12 formed on one end thereof. Member 11 is provided with a circular hole 13 of a diameter substantially equal to or greater than the diameter of the ball 12. The opening 13 is adapted to receive the ball 12 therein and means will be described herein for preventing the ball from coming out of the opening.

A U-shaped clip element 14 is provided with a base portion or leg 15 and an upper portion or leg 16. The upper portion 16 is provided with a longitudinal slot 17 which bifurcates the upper portion and creates fingers 18 and 19. The base portion 15 is provided with a dimple 20 which is deformed away from the upper portion 16 and aligned with slot 17.

Slot 17 has a width which is less than the diameter of the ball 12. The dimple 20 is preferably formed with a radius substantially equal to that of the ball 12. The overall height of the clip from the base of the dimple 20 to the upper portion 16 is less than the diameter of the ball 12. The upper portion of the ball forms a constriction which the bifurcated leg of the clip is adapted to engage.

In assembly the ball 12 is positioned in the opening 13 of the member 11 and the U-shaped clip 14 is secured to the ball 12 by setting the ball in the dimple 20 and straddling the ball with the fingers 18 and 19 by permitting a portion of the ball to enter the slot 17. The height of the clip and the diameter of the ball are preferably so proportioned that a slight distortion of the clip is necessary to effect the assembly. The distortion is in the direction of separating the upper portion 16 from the lower portion 15. The clip is preferably formed of resilient metal and thereby accommodates the distortion and effects a snap engagement of the clip on the ball. As illustrated in the drawings the base portion 15 and upper portion 16 of the clip straddle the member 11 and prevent it from separating from the ball and an operative connection is thus formed between the members 10 and 11. The connection is adapted to transmit force directly from member to member independently of the clip and the only function performed by the clip is to prevent the members from separating.

Figure 6:
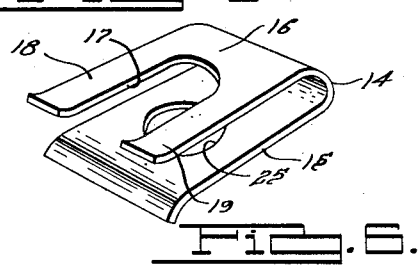
Fig. 6 is a perspective view of a modified clip.

Fig. 6 illustrates a modified clip in which an opening 25 is substituted for the dimple 20. The opening is preferably formed with a diameter less than the diameter of the ball 12 so that the latter may be set therein.

We claim:

1. In a linkage the combination of a first member having a ball portion provided on one end thereof, a second member having a lateral opening adapted to receive said ball and clip means adapted to engage said ball on each side of said second member to prevent the removal of said ball from said opening.

2. In a linkage the combination of a first member having an opening therein, a second member having a body portion and a head spaced therefrom by a reduced neck portion, said head penetrating said opening, a clip having a bifurcated portion straddling said neck portion on one side of said first member and an extended portion engaging said head on the other side of said first member to prevent the withdrawal of said head from said opening.

3. In a linkage the combination of a first member having an opening therein, a second member having a body portion and a head spaced therefrom by a reduced neck portion, said head penetrating said opening, a clip having a bifurcated portion straddling said neck portion on one side of said first member and an extended portion abutting the top of said head on the other side of said first member to prevent the separation of said members without increasing the friction between said members.

ALEXANDER G. HERRESHOFF.
JOHN P. BUTTERFIELD.

REFERENCES CITED

The following references are of record in the file of this patent:

UNITED STATES PATENTS

| Number | Name | Date |
| --- | --- | --- |
| 232,580 | Welch | Sept. 21, 1880 |
| 1,392,561 | Duffy | Oct. 4, 1921 |
| 1,752,544 | Sparrow | Apr. 1, 1930 |
| 1,933,724 | Fox | Nov. 7, 1933 |
| 1,966,599 | Roualet | July 17, 1934 |
| 2,062,685 | Tinnerman | Dec. 1, 1936 |
| 2,189,667 | Kries | Feb. 6, 1940 |